United States Patent

Sauser

[15] 3,654,552
[45] Apr. 4, 1972

[54] SMALL FRAMES FOR ROTARY OR MOVING COILS OF ELECTRICAL MEASURING INSTRUMENTS

[72] Inventor: Alfred Sauser, Solothurn, Switzerland
[73] Assignee: Sauser AG, Solothurn, Switzerland
[22] Filed: Aug. 5, 1970
[21] Appl. No.: 61,452

Related U.S. Application Data

[63] Continuation of Ser. No. 741,454, July 1, 1968, abandoned.

[30] Foreign Application Priority Data

July 29, 1967 Switzerland ...................10754/67

[52] U.S. Cl. .........................................324/154 R
[51] Int. Cl. ............................................G01r 1/00
[58] Field of Search ..................324/151, 154, 155; 335/222

[56] References Cited

UNITED STATES PATENTS 2,388,897  11/1945  Ammon ..............................324/155

Primary Examiner—Alfred E. Smith
Attorney—Werner W. Kleeman

[57] ABSTRACT

A small frame means for the moving coil of electrical measuring instruments, comprising a substantially rectangular-shaped coil winding body member formed of metal. A support member for spiral spring means and an indicator means is provided at the central region of two oppositely situated sides of the coil winding body member. Bearing needle means forming an axis of rotation cooperate with the support member. The coil winding body member and said support member cooperate with one another to enclose the coil windings, one of said members being substantially U-shaped and the other of said members being substantially flat. Furthermore, the invention contemplates the provision of means for providing an upset connection between the coil winding body member and the support member, with said support member being substantially centered at said coil winding body member.

10 Claims, 6 Drawing Figures

Patented April 4, 1972  3,654,552

INVENTOR.
ALFRED SAUSER
BY Jacobi & Davidson
ATTORNEYS.

3,654,552

SMALL FRAMES FOR ROTARY OR MOVING COILS OF ELECTRICAL MEASURING INSTRUMENTS

BACKGROUND OF THE INVENTION

This application is a continuation application of my commonly assigned, U.S. application, Ser. No. 741,454, filed July 1, 1968 now abandoned, and entitled "Small Frames For Rotary or Moving Coils of Electrical Measuring Instruments."

The present invention relates to improvements in small frames for the rotary or moving coils of electrical measuring instruments.

The rotary or moving coils of electrical measuring instruments can be equipped with a small metal frame which serves as the coil winding body in order to impart the necessary support to the windings in the event that the coil winding is not sufficiently self-supporting. However, small metallic frames are also utilized in order to obtain a desired dampening of the coil movement. Small frames having a low ohmic resistance of their material provide better dampening than frames with high resistance. Frames formed of copper are used to obtain a stronger dampening, for weaker dampening aluminum frames are employed. Such frames are manufactured in known manner from thin-walled tubes from which rings are cut and pressed into the desired frame shape.

If the frames are provided for internal support or mounting, it is possible to secure bearing needles equipped with flanges directly to the frame. The small frame can also be equipped with hubs or shoulders at which there can be attached, for instance by pressing, the indicator and the spiral spring support, before the coil winding is wound upon the frame. Such frames possess the advantage that they can be mass produced with small dimensions. Furthermore, the technique of building instruments with internal support or mounting means has numerous advantages, but with regard to small dimensioned rotary or moving coils it has the drawback that with constant bearing play for smaller frames the pivotal or tilting error considerably increases. Rotary coil instruments with external mounting or support means have a considerably small pivotal or tilting error for the same size frames and the same bearing play. It is for these reasons that small rotary coil frames for external support or mounting means are technically necessary notwithstanding a possible complicated shape and mode of manufacture.

If the bearing needles for the external mounting or support of small rotary coil frames are secured directly to the coil winding body, then the winding must be guided at both sides past the bearing needles, wherefore the winding is wider at these locations. Furthermore, the application of the winding to the coil winding body is difficult and is not suited for mass production. It is also known to the art to externally mount at the winding, bearing needles equipped with flanges individually or in combination with the indicator and the spiral spring support and to secure such by means of adhesive or by means of a band or the like to the frame. Such rotary coils have the disadvantage that the bearing needles, the indicator and the spiral spring support are not centered at the coil winding body. This technique of attachment is likewise not suited for mass production.

SUMMARY OF THE INVENTION

Accordingly, it is a primary object of the present invention to provide an improved rotary coil frame means for electrical measuring instruments which overcomes the aforementioned drawbacks of the prior art structures.

Another more specific object of the present invention relates to an improved small frame for the rotary or moving coil of electrical measuring instruments which is quite suitable for carrying out mass production techniques.

Still another object of the present invention pertains to an improved moving coil frame for electrical measuring instruments which is relatively simple in construction, quite suitable for carrying out mass production operations, and serves to achieve accurate measurement readings.

Now, in order to implement these and still further objects of the present invention, which will be more readily apparent as the description proceeds, the invention is concerned with small frames for the moving or rotary coils of electrical measuring instruments and incorporates a coil winding body member of substantially rectangular shape which is formed of metal. Furthermore, there is provided a support member for indicator means and spiral spring means which is located at the central region between two oppositely situated sides of the frame. Bearing needles form an axis of rotation and cooperate with the support member. According to the invention, the coil winding body member and the support member, of which one member is bent in substantially U-shaped configuration and the other member is planar or flat, are upset connected with one another and enclose the coil winding, and the support member is centered at the coil winding body member. In the case of an external support or mounting arrangement, the bearing needles can be centrally secured in known manner to the support member for the spiral spring means and the indicator means and during application of the support member for the spiral spring means and the indicator means at the wound frame the centering of the bearing needles in the axis of the frame takes place automatically.

BRIEF DESCRIPTION OF THE DRAWING

The invention will be better understood, and objects other than those set forth above, will become apparent, when consideration is given to the following detailed description thereof. Such description makes reference to the annexed drawing wherein: 2

DESCRIPTION OF THE PREFERRED EMBODIMENTS

Figure 2:
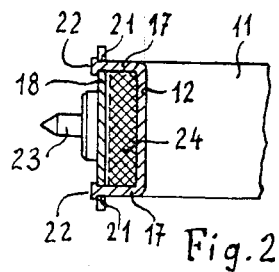
FIG. 2 is a cross-sectional view of a wound frame of the type shown in FIG. 1.
Figure 1:
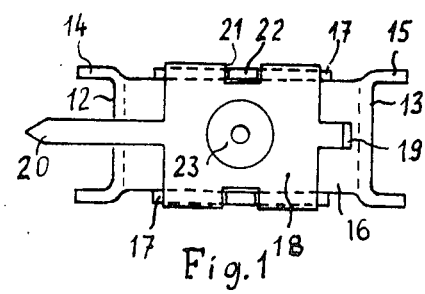
FIG. 1 illustrates a small frame without any winding and with a flat or planar indicator fixedly centered at the coil winding body.

It should be understood that the small frames illustrated in the drawing are formed of sections of thin-walled copper or aluminum tubes. The sides of the frame are cut out at their edges in such a manner that the material situated externally of the winding surface can be at least outwardly bent at the sides parallel to the axis of rotation, in order to form well means which laterally bound the winding space or compartment. Now, in the embodiment shown by way of example in FIGS. 1 and 2 the coil winding body member 11 is provided with walls 14 and 15 which limit the winding space or compartment and which are located at the sides 12 and 13 which are parallel to the axis of rotation. At the sides 16 which intersect or cut the axis of rotation, and which are situated behind one another in FIGS. 1 and 2, both of the boundary walls 17 form a bearing or mounting means for the indicator means at one side and the spiral spring support at the other side. The support member for the indicator means and the spiral spring incorporates a rectangular flat plate 18 having a horn or upstanding portion 19 for attachment of the spiral spring. The indicator means is equipped with an indicator arm 20 at which there can be attached an indicator marker or flag or the like. The small plate 18 is laterally provided with a respective slot or gap 21, and a flap member 22 protruding from each boundary wall 17 engages with each such slot 21, so that the plate member 18 is centered at the coil winding body member 11. A bearing needle 23 is centrally secured to the small plate member 18 and which, together with the bearing needle located at the opposite side of the frame, defines or forms the axis of rotation. The support member 18 for the indicator means and the spiral spring are mounted upon the wound frame. The coil winding body 11 and the support member 18 for the indicator 20 and spiral spring then enclose the winding 24 and are upset connected with one another by upsetting a flap 22.

Figure 4:
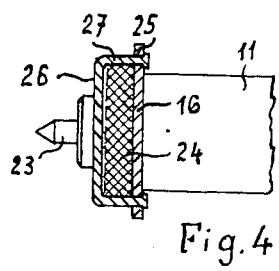
FIG. 4 is a cross-sectional view of the wound frame of FIG. 3.
Figure 3:
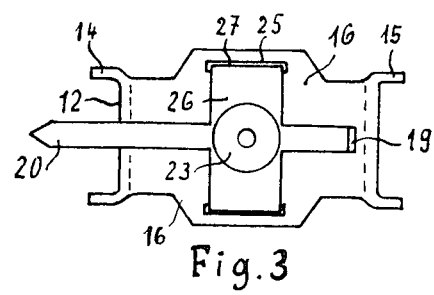
FIG. 3 illustrates a small frame without the winding and with a flexed or bent indicator fixedly centered at the coil winding body member.

In the embodiment according to FIGS. 3 and 4, the coil winding body member only has raised boundary walls 14 and 15 at the sides 12 and 13 parallel to the axis of rotation. The sides 16 which cut or intersect the axis of rotation are flat and widened at their central region and possess a slot 25 at both sides externally of the winding surface. The indicator and spiral spring support member of this embodiment incorporates a substantially U-shaped flexed or bent portion 26 and engages by means of the legs 27 thereof in the slots 25. Similar to what was explained with regard to FIGS. 1 and 2, a bearing needle 23 is centrally mounted upon this component. The indicator and spiral spring support members are centered at the coil winding body and by upsetting the legs 27 are upset connected with such.

Figure 6:
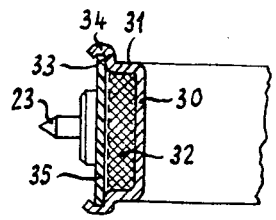
FIG. 6 is a cross-sectional view of the arrangement of FIG. 5.
Figure 5:
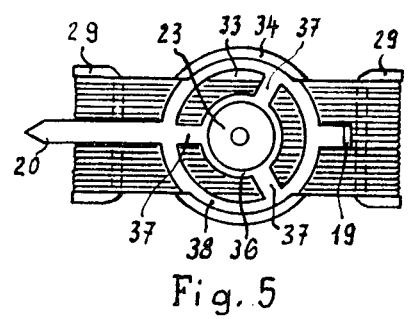
FIG. 5 illustrates a small frame with a displaceably centered indicator at the coil winding body member.

In the embodiment depicted in FIGS. 5 and 6 the coil winding body member has boundary walls 29 at the sides parallel to the axis of rotation, and boundary walls 31 at the sides intersecting the axis of rotation and which laterally bound the winding 32. The walls 31 externally of the height of the winding are formed to provide socket means which are coaxial to the axis of rotation, in that the boundary walls 31 are widened to provide substantially circular segment shaped support surfaces 33 having a cylindrical guide wall means 34. The support member for the spiral spring and the indicator possesses a flat circular plate 35 which centrally supports a bearing needle and is seated in the socket means. By upsetting the marginal edge of the socket means the plate 35 is upset connected with the coil winding body. This connection can be carried out such that the indicator and spiral spring support are displaceable for adjustment purposes.

Furthermore, it should be understood that the plate 35 can be constructed to be a solid body. However, it can be also advantageous to cut out the plate 35 so that a central eyelet or nave 36 which supports the bearing needle 23, is connected by means of three ribs 37 with an external ring 38 at which there is seated a horn or projection 19 for attaching the spiral spring and furthermore an indicator arm 20 for attaching an indicator flag or marker. The plate 35 is manufactured from resilient material, for instance bronze sheet metal. Such a plate 35 insures that the bearing needles can flex in the direction of the axis of rotation and therefore provide, in simple manner, a resilient mounting of a rotary coil frame.

By virtue of the flap-slot connection arrangement of FIG. 1 to 4 necessary for the centering of the indicator and spiral spring support member, and the socket means of FIG. 5 and 6, there is provided the upset connection which is advantageous for mass production.

It should be apparent from the foregoing detailed description, that the objects set forth at the outset to the specification have been successfully achieved.

What is claimed is:

1. A small frame means for the moving coil of electrical measuring instruments, comprising a substantially rectangular-shaped coil winding body member formed of metal, a respective support member for bearing needle means provided at the central region of two oppositely situated sides of said coil winding body member, bearing needle means forming an axis of rotation cooperating with said support members, said coil winding body member including a winding surface for the coil windings, said coil winding body member and said support members cooperating with one another to enclose the coil windings at said winding surface, said coil winding body member being provided at its marginal regions externally of said winding surface with means defining a zone cooperating with said support members, one of said members being substantially U-shaped and the other of said members being substantially flat at the region of the coil windings, and means for providing a connection between said coil winding body member and each of said support members for enclosing said coil windings, both said support members being substantially centered at said coil winding body member, said coil winding body member includes laterally raised boundary walls for the coil windings, said raised boundary walls being in the form of substantially circular segment-shaped support surfaces having substantially cylindrical guide walls, to thereby define socket means for said support members, said socket means being arranged substantially coaxially with respect to said axis of rotation, each of said support members incorporating a respective flat substantially circular-shaped plate member seated in said associated socket means, each said flat substantially circular-shaped plate member of each associated support member being constructed to be resilient in the direction of the axis of rotation.

2. A small frame means for the moving coil of electrical measuring instruments, comprising a substantially rectangular-shaped coil winding body member formed of metal, a support member for spiral spring means and an indicator means provided at the central region of two oppositely situated sides of said coil winding body member, bearing needle means forming an axis of rotation cooperating with said support members, said coil winding body member and said support member cooperating with one another to enclose the coil windings, said coil winding body member including laterally raised boundary walls for the coil windings, said raised boundary walls being formed of substantially circular segment-shaped support surfaces having substantially cylindrical guide walls, to thereby define a socket means for said support members for the spiral spring means and the indicator means, said socket means being arranged substantially coaxially with respect to said axis of rotation, and each said support member comprising a respective flat substantially circular plate member bearing against said laterally raised boundary walls and adjustably seated in said socket means.

3. A small frame means as defined in claim 2, wherein each said flat substantially circular-shaped plate member of each said support member is provided with segment-shaped cutouts defining ribs connecting a central eyelet with an external ring so as to provide resiliency in the direction of said axis of rotation.

4. A small frame means for the moving coil of electrical measuring instruments, comprising a substantially rectangular-shaped coil winding body member formed of metal, a respective support member for bearing needle means provided at the central region of two oppositely situated sides of said coil winding body member, bearing needle means forming an axis of rotation carried by said support members, said coil winding body member including a winding surface for the coil windings, said coil winding body member and said support members being connected with one another to enclose the coil windings at said winding surface, said coil winding body member being formed of metallic tubing and being provided at its marginal regions externally of said winding surface with means defining a retaining and centering zone cooperating with said support members, the marginal regions of said coil winding body member located externally of said winding surface and extending along opposite sides of said coil winding body member in a direction substantially parallel to said axis of rotation of said bearing needle means are subsequently flexed wall members defining lateral boundary walls for delimiting compartment means for receiving said winding coils, each said support member for said bearing needle means being substantially U-shaped, and said retaining and centering zone of said coil winding body member being disposed in a plane together with said winding surface of said coil winding body member.

5. A small frame means for the moving coil of electrical measuring instruments as defined in claim 4, wherein said bearing needle means comprises a pair of bearing needles, each of which is substantially centrally secured to its associated support member.

6. A small frame means for the moving coil of electrical measuring instruments as defined in claim 4, wherein said means defining a retaining and centering zone embodies connection means providing a flap-slot connection arrangement.

7. A small frame means for the moving coil of electrical measuring instruments, comprising a substantially rectangular-shaped coil winding body member formed of metal, a respective support member for bearing needle means provided at the central region of two oppositely situated sides of said coil winding body member, bearing needle means forming an axis of rotation carried by said support members, said coil winding body member including a winding surface for the coil windings, said coil winding body member and said support members being connected with one another to enclose the coil windings at said winding surface, said coil winding body member being formed of metallic tubing and being provided at its marginal regions externally of said winding surface with cut-out means defining a retaining and centering zone cooperating with said support members, the marginal regions of said coil winding body member located externally of said winding surface and extending along opposite sides of said coil winding body member in a direction substantially parallel to said axis of rotation of said bearing needle means are subsequently flexed wall members defining lateral boundary walls for delimiting compartment means for receiving said winding coils, each said support member for said bearing needle means being essentially flat and said retaining and centering zone of said coil winding body member possessing a substantially U-shaped flexed configuration at least at the region of said support member for said bearing needle means.

8. A small frame means for the moving coil of electrical measuring instruments as defined in claim 7, wherein the marginal regions of said coil winding body member located externally of said winding surface and along the sides of said coil winding body member extending perpendicular to said axis of rotation of said bearing needle means are flexed wall members defining lateral boundary walls for delimiting compartment means receiving said coil windings.

9. A small frame means for the moving coil of electrical measuring instruments as defined in claim 7, wherein said means defining a retaining and centering zone embodies connection means providing a flap-slot connection arrangement.

10. A small frame means for the moving coil of electrical measuring instruments as defined in claim 7, wherein said bearing needle means comprises a pair of bearing needles, each of which is substantially centrally secured to its associated support member.

* * * * *